(12) United States Patent
Dietrich, Jr.

(10) Patent No.: US 6,720,975 B1
(45) Date of Patent: Apr. 13, 2004

(54) SUPER-SAMPLING AND MULTI-SAMPLING SYSTEM AND METHOD FOR ANTIALIASING

(75) Inventor: Douglas Sim Dietrich, Jr., Campbell, CA (US)

(73) Assignee: NVIDIA Corporation, Santa Clara, CA (US)

( * ) Notice: Subject to any disclaimer, the term of this patent is extended or adjusted under 35 U.S.C. 154(b) by 110 days.

(21) Appl. No.: 09/982,449

(22) Filed: Oct. 17, 2001

(51) Int. Cl.[7] .................................................. G09G 5/00
(52) U.S. Cl. ....................................................... 345/611
(58) Field of Search .................. 345/611–614, FOR 156

(56) References Cited

U.S. PATENT DOCUMENTS

| | | | | |
|---|---|---|---|---|
| 5,555,359 A | * | 9/1996 | Choi et al. ................... 395/141 |
| 5,841,447 A | * | 11/1998 | Drews ......................... 345/523 |
| 6,072,500 A | * | 6/2000 | Foran et al. .................. 345/431 |
| 6,181,347 B1 | * | 1/2001 | Devic et al. .................. 345/430 |
| 6,452,595 B1 | * | 9/2002 | Montrym et al. ............. 345/426 |
| 2001/0033287 A1 | * | 10/2001 | Naegle et al. ................ 345/601 |
| 2003/0063095 A1 | * | 4/2003 | Cheung et al. .............. 345/582 |

* cited by examiner

*Primary Examiner*—Matthew C. Bella
*Assistant Examiner*—J. F. Cunningham
(74) *Attorney, Agent, or Firm*—Silicon Valley IP Group, PC; Kevin J. Zilka

(57) ABSTRACT

A system, method, and computer program product are provided for antialiasing during rendering in a graphics pipeline. Initially, a primitive of vertex data is received in a graphics pipeline. Next, a super-sampling operation is performed on the primitive of vertex data utilizing the graphics pipeline. Further, a multi-sampling operation is performed on the primitive of vertex data utilizing the graphics pipeline.

18 Claims, 9 Drawing Sheets

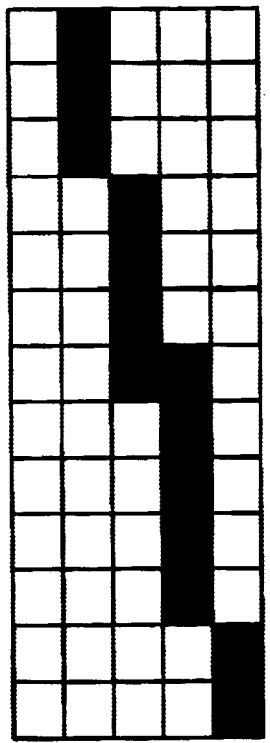
Aliased Line
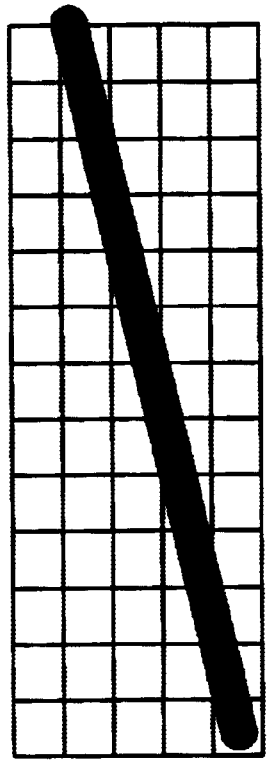
Smooth Line
**Figure 1
(Prior Art)**

SUPER-SAMPLING AND MULTI-SAMPLING SYSTEM AND METHOD FOR ANTIALIASING

FIELD OF THE INVENTION

The present invention relates to computer graphics, and more particularly to antialiasing in a computer graphics processing pipeline.

BACKGROUND OF THE INVENTION

Images to be drawn on a raster-scan display, having a two dimensional array of pixel locations, must first be quantized to discrete memory locations, such as within a frame buffer, which correspond to the pixel locations of the array. This process limits the resolution of such displays to the physical characteristics of the array (i.e., 1024.times.1280 pixel locations) and often produces visual artifacts of the images when a human viewer's ability to resolve the displayed image exceeds the limited resolution of the display on which the image is drawn.

This effect is referred to as "aliasing" because visual artifacts are created by differences in the spatial frequency characteristics of the display and the spatial frequency characteristics of the viewer's eyes. A familiar example of such an artifact is the jagged appearance of an image, such as a straight line or primitive edge, that results when the image is not aligned along a horizontal or vertical line of pixel locations. Prior Art FIG. 1 illustrates two versions of a line: one perfect line and one heavily aliased.

Techniques for removing or reducing artifacts by smoothing the appearance of the displayed image and/or increasing the spatial frequency characteristics of the display are known as "antialiasing" techniques.

Super-sampling is an antialiasing technique that increases the spatial quantization of the display's array by increasing the number of data samples that are taken at or around each pixel location corresponding to a portion of the image to be displayed, and then combining the resulting values of these multiple data samples to obtain a final display value for each pixel location. In prior art systems, each super-sample typically includes both a color-value (for either color or gray-scale systems) and a Z-value (a representation of the depth of a pixel which is used to perform hidden surface removal) relating to a reference point (one reference point per super-sample) within the pixel.

Another well known technique includes multi-sampling. Unlike super-sampling, multi-sampling uses the color-values from the original sample for all sub-samples, and relies on the sub-samples positions to achieve its effect. The number of samples per pixel may vary from application to application.

While super-sampling exhibits output of a higher quality, it offers no speed advantages over multi-sampling. On the other hand, multi-sampling exhibits less quality and higher speed.

There is thus a need for achieving a compromise between quality and speed when antialiasing.

DISCLOSURE OF THE INVENTION

A system, method, and computer program product are provided for antialiasing during rendering in a graphics pipeline. Initially, a primitive of vertex data is received in a graphics pipeline. Next, a super-sampling operation is performed on the primitive of vertex data utilizing the graphics pipeline. Further, a multi-sampling operation is performed on the primitive of vertex data utilizing the graphics pipeline.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which:

Prior Art FIG. 1 illustrates two versions of a line: one perfect line and one heavily aliased.

DESCRIPTION OF THE PREFERRED EMBODIMENTS

Figure 1A:
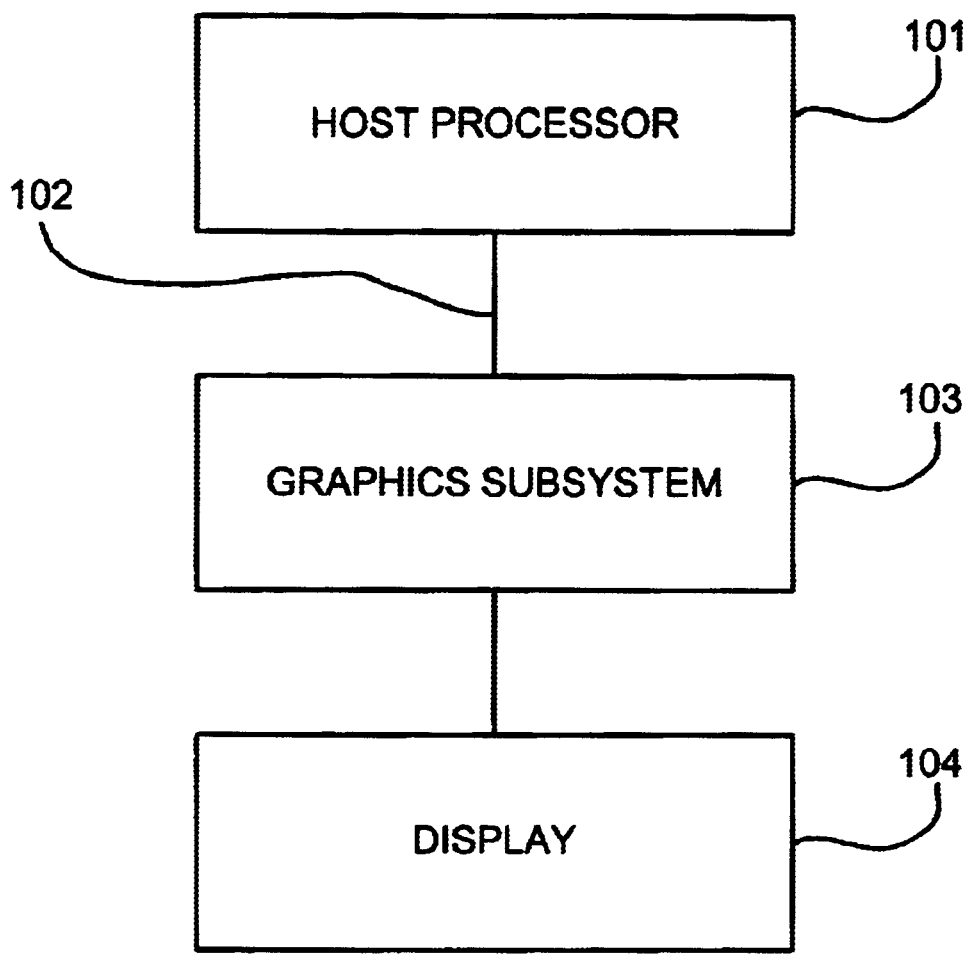
FIG. 1A shows a block diagram of a graphics computer, in accordance with one embodiment.

FIG. 1A shows a block diagram of a graphics computer, in accordance with one embodiment. As shown, a host processor 101 stores and executes an application program. Such application program issues graphics commands over a connection 102 to a graphics subsystem 103. The interconnect 102 can either be a general purpose bus that is shared with other I/O devices, e.g. PCI bus, or a dedicated graphics bus, e.g. AGP. Of course, any type of interconnect 102 may be utilized. In use, the graphics subsystem 103 may receive graphics commands and, in response, either update its internal state or renders primitives described by the host processor 101 to a display device 104.

Figure 2:
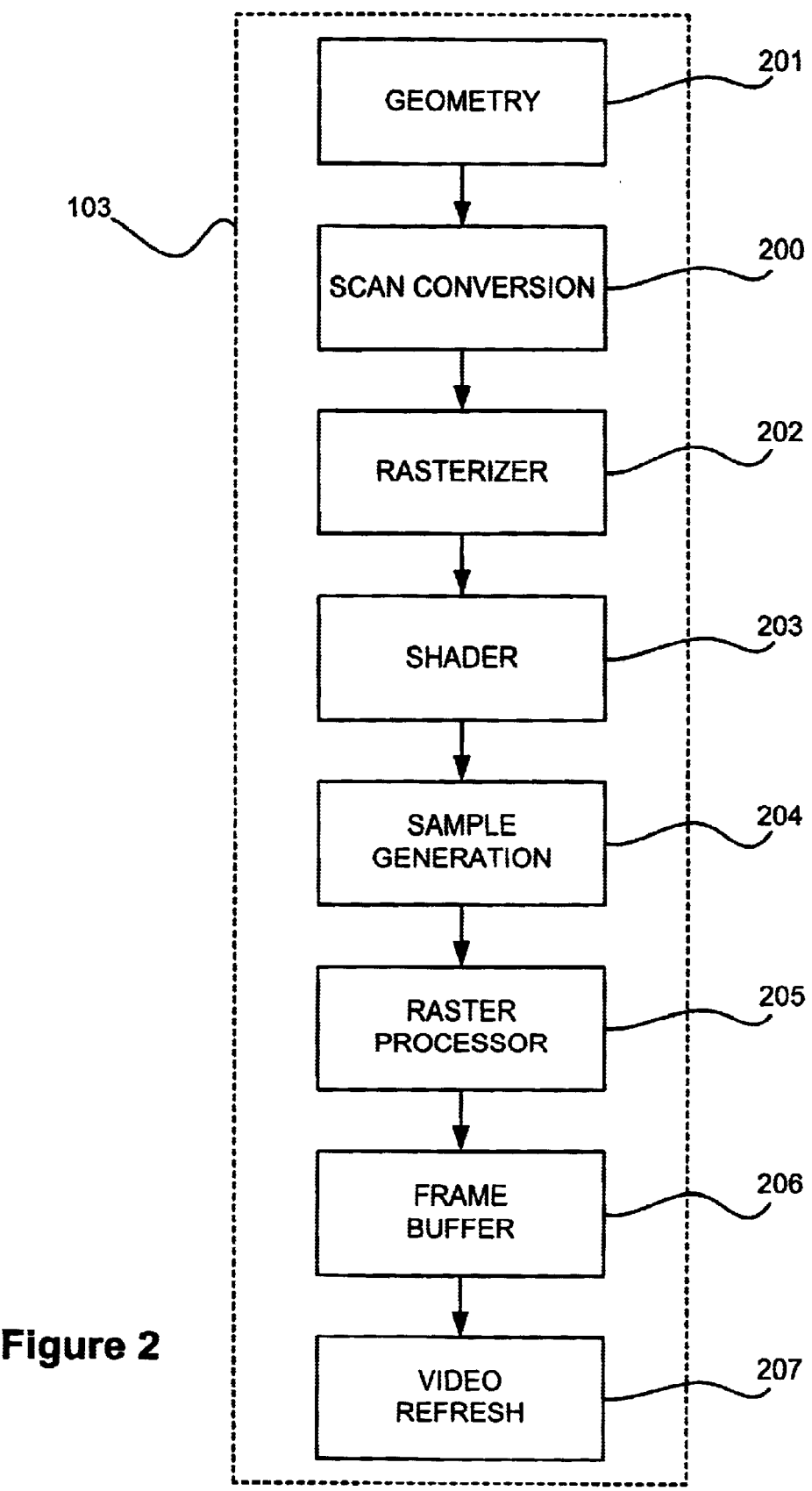
FIG. 2 illustrates a more detailed diagram showing the internal structure of the graphics subsystem of FIG. 1A.

FIG. 2 illustrates a more detailed diagram showing the internal structure of the graphics subsystem 103 of FIG. 1A. As shown, a geometry stage 201 is provided which transforms primitives into a screen-aligned coordinate system. The geometry stage 201 also removes portions of the primitives that fall outside the rendering area (clipping). Further, various computations are performed by the geometry stage 201 such as lighting to determine the color of each vertex describing the primitives. Such vertex data may thus be processed in any desired manner.

Such vertex data is then received by the scan conversion subsystem 200 which breaks the vertex data down into pixel data, such as pixel screen coordinates and parameter values for each of the individual pixels of the display 104. Each pixel is thereby assigned at least an X and Y screen coordinate, plus a number of parameters, such as red (R), green (G) and blue (B) color values, and alpha (A) values if alpha blending is supported. Alpha values are used to represent the opacity of a particular pixel.

An additional pixel parameter is the super-sample coverage mask, which is based on the size and geometry of a predefined super-sample size, and which includes an indication of those super-samples which are covered or uncovered by the particular primitive to be drawn. More information on the super-sampling techniques of the present embodiment will be set forth in greater detail during reference to FIGS. 2A–2C.

The transformed, clipped and lit vertices form the input for a rasterizer 202. The rasterizer 202 compares new pixel data to old pixel data stored in a memory, and updates old pixel data as necessary on a pixel-by-pixel basis with new pixel data.

Also included is a shader 203 that computes the final fragment, e.g. by applying texture maps or shader programs to the fragment. A sampling stage 204 then generates multiple samples for each fragment via multi-sampling. More information on the multi-sampling of the present embodiment will be set forth in greater detail during reference to FIG. 4.

After multi-sampling, the individual samples are sent to a raster-processor 205 as if they were regular fragments. The raster-processor 205 performs various operations on the fragments, including z/stencil testing and color or alpha blending. This may require the raster-processor 205 to read a frame buffer memory 206 in order to retrieve the destination Z or the destination color. To this end, the final pixel color and Z are written back to the frame buffer memory 206.

When all primitives in the scene have been rendered in this manner, the contents of the frame buffer memory 206 are scanned out by a video refresh unit 207 and sent to the display 104. In the case of a multi-sampled color buffer, the (high-resolution) multi-sample image is downfiltered to display resolution. Downfiltering can be done as a separate operation prior to display. Alternatively, downfiltering can be done during the process of scanout and display.

As an option, each of the foregoing components of the graphics subsystem 103 may be situated on a single semiconductor platform. In the present description, the single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation. Of course, the various modules may also be situated separately or in various combinations of semiconductor platforms per the desires of the user.

In the context of the foregoing processing, tile rending may be carried out. Typically, the frame buffer memory 206 takes the form of direct random access memory (DRAM). Such DRAM is organized as a matrix of storage bits. Read or write accesses to bits in the same row can be performed more efficiently than to bits in different rows. The present embodiment thus organizes the storage of pixels in the frame buffer such that neighboring pixels are stored in a single row in a DRAM bank (one or more associated DRAM chips). Such neighborhoods or pixels are often referred to as "tiles." Since the present frame buffer memory 206 is organized to store pixels in a tile in one page of memory, it may be referred to as a "tiled buffer."

To fully exploit the faster access time to pixels in a tile, processing of fragments is organized such that all fragments for pixels in a particular tile are grouped together. In one embodiment, it may be assumed that tiles are 4×4 pixel neighborhoods, i.e. fragments are processed in groups of up to 16. It should be noted, however, that tile sizes larger and smaller are possible and may be preferable in certain circumstances.

Figure 2A:
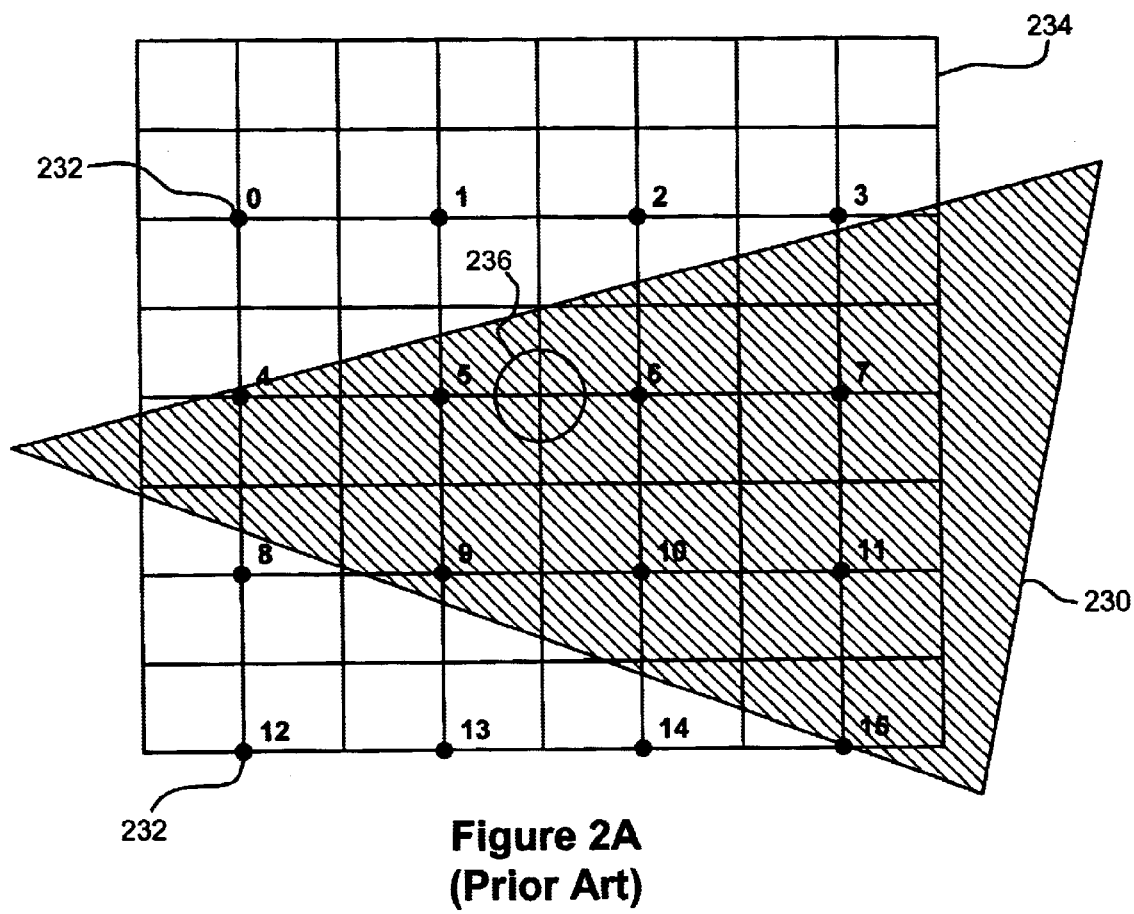
FIGS. 2A–2C illustrate more information on super-sampling, in accordance with one embodiment.

FIG. 2A illustrates how a 16-bit super-sample coverage mask is derived by the scan conversion subsystem 200 of FIG. 2. It should be noted that the super-sampling may take place in any other component of the graphics subsystem 103, and further in any desired order with respect to the multi-sampling.

Super-sampling is accomplished by sampling a primitive 230 of the vertex data at any number [i.e. sixteen (0–15)] of discrete points 232. Each point 232 is aligned to a geometrically predefined (i.e. 8-by-8) grid 234 over the current pixel, which has an origin 236. With respect to the super-sample coverage mask of the preferred embodiment, the predetermined method for choosing such super-samples is that of point sampling. It should be noted, however, that the present invention is independent of the method by which samples are chosen and would work equally well with an area sampling technique.

Figure 2B:
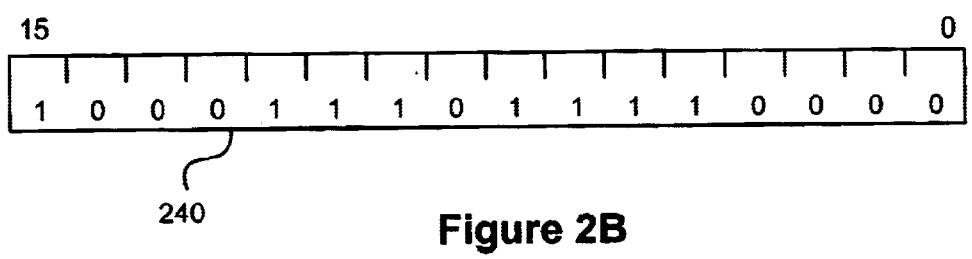

If a sample point 232 intersects the primitive, the corresponding bit in the super-sample coverage mask 240 of FIG. 2B is set to "1." In the present example, bits four to seven, nine to eleven and fifteen are set to. "1." If the sample point 232 lies outside the primitive 230, then the corresponding bits of the super-sample coverage mask 240 are set to "0." Although hardware constraints of the scan conversion subsystem of the preferred embodiment of the present invention dictate that sample patterns must be constant from pixel to pixel and that each sample must fall on the grid covering the pixel, a system excluding these constraints could be readily envisioned by a person of ordinary skill in the art in view of the present disclosure.

Figure 2C:
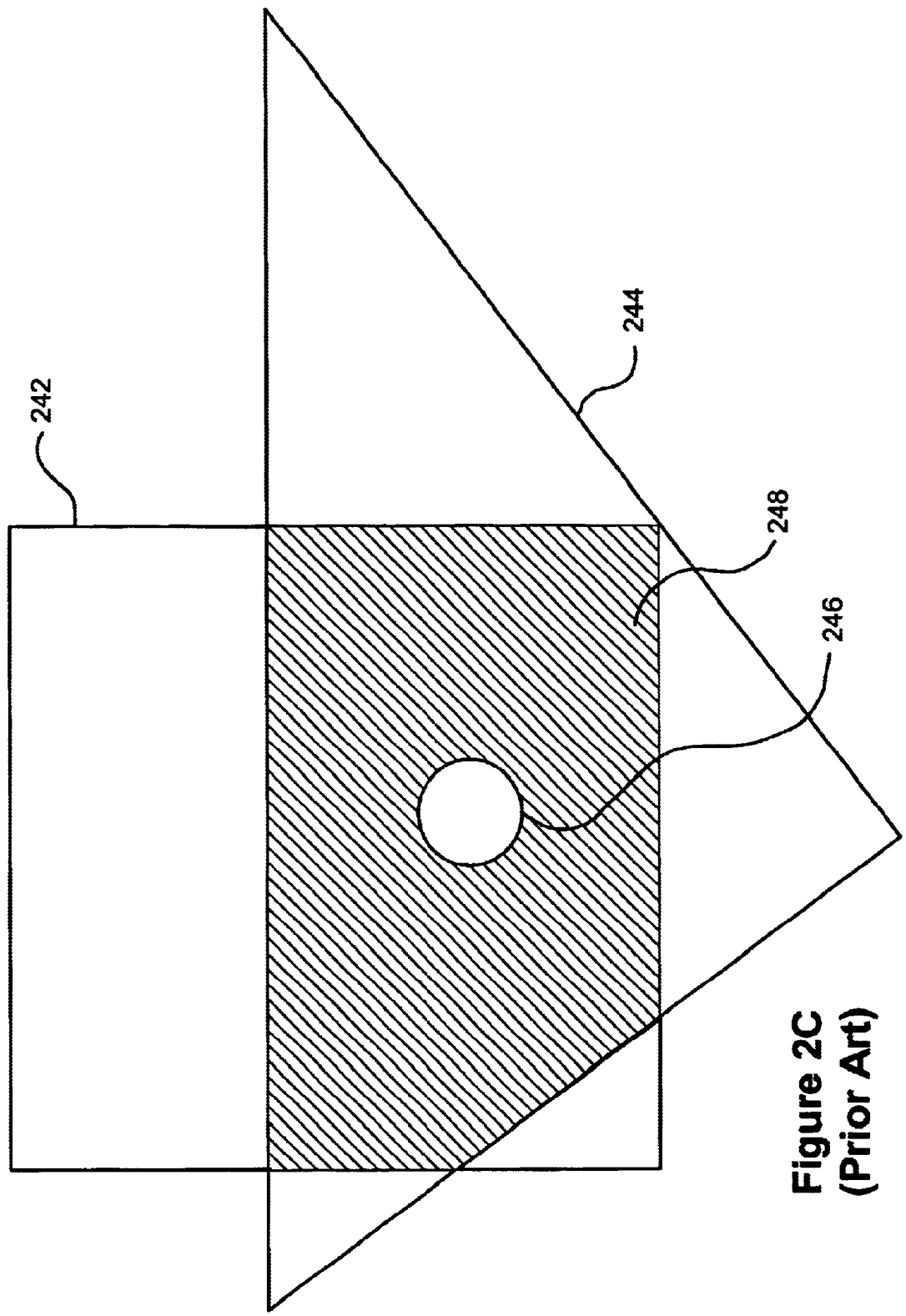

FIG. 2C illustrates how color values for a pixel 242 are first determined by the scan conversion subsystem 200 computing R, G and B (and A, if alpha blending is enabled) equations for the primitive 244. at the centroid 246 of the pixel fragment 248. The pixel fragment 248 is formed by the intersection of the pixel 242 and the primitive 244. Since the centroid 246 is guaranteed to lie inside both the pixel 242 and the primitive 244, in contrast to the pixel's origin which can lie outside of the primitive 244, the centroid 246 is used to compute the color values, thereby preventing illegal color values from being generated for the different pixels.

Figure 3:
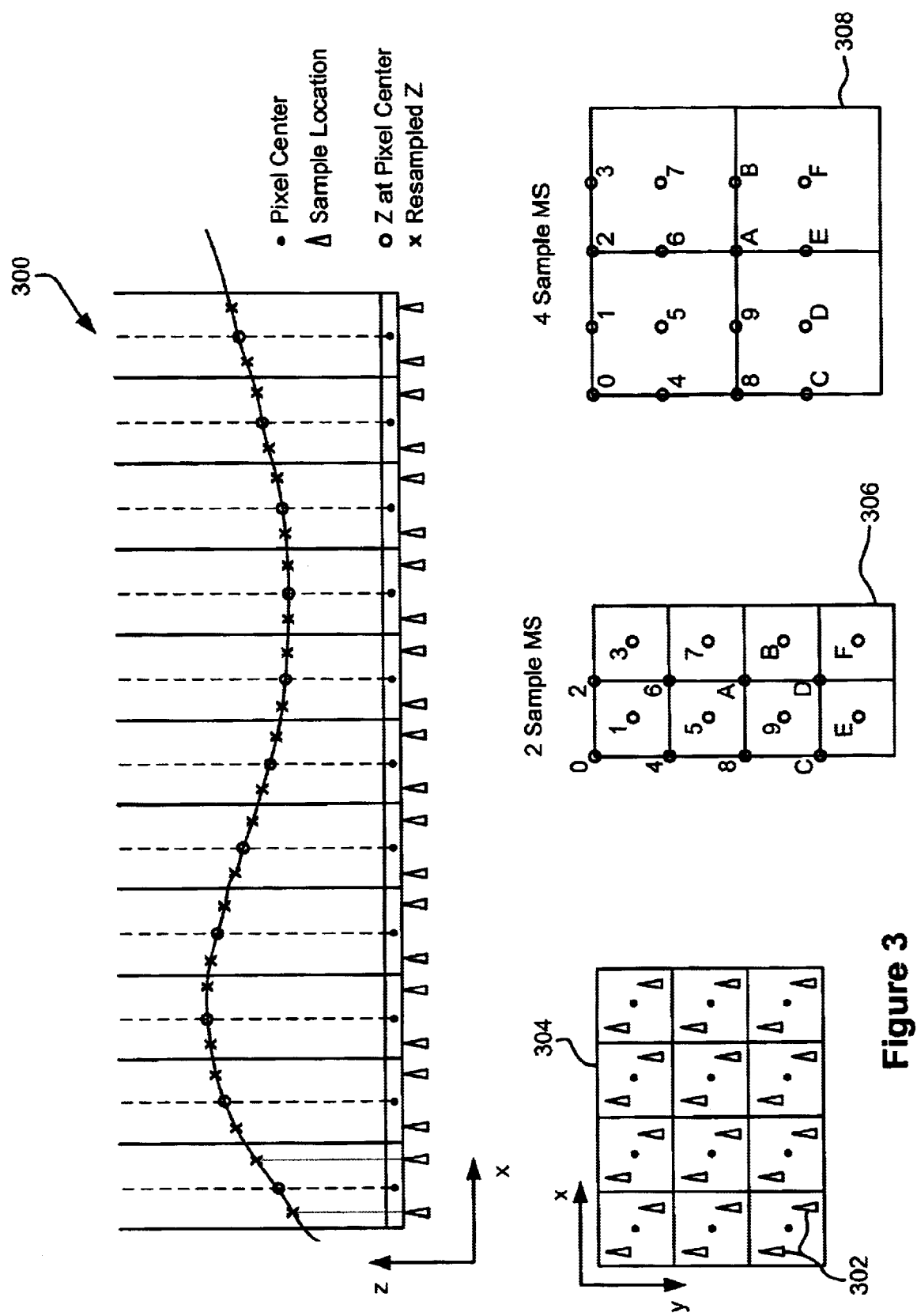
FIG. 3 illustrates more information on multi-sampling, in accordance with one embodiment.

FIG. 3 illustrates the effect 300 of multi-sampling, as carried out by the sampling stage 204 of FIG. 2. It should be noted that the multi-sampling may take place in any other component of the graphics subsystem 103, and further in any desired order with respect to the super-sampling.

The process of multi-sampling adjusts the fragment depth value to a sampling location in the pixel. All samples within a fragment carry the same color. As shown, sample locations 302 may be jittered, rotated, or skewed within a pixel 304. In other words, the sample locations 302 may be diagonally positioned within the pixel 304. Of course, these options may be varied per the desires of the user.

In another embodiment, either 2-sample multi-sampling 306, 4-sample multi-sampling 308, or any other #-multi-sampling may be employed per the desires of the user.

Figure 4:
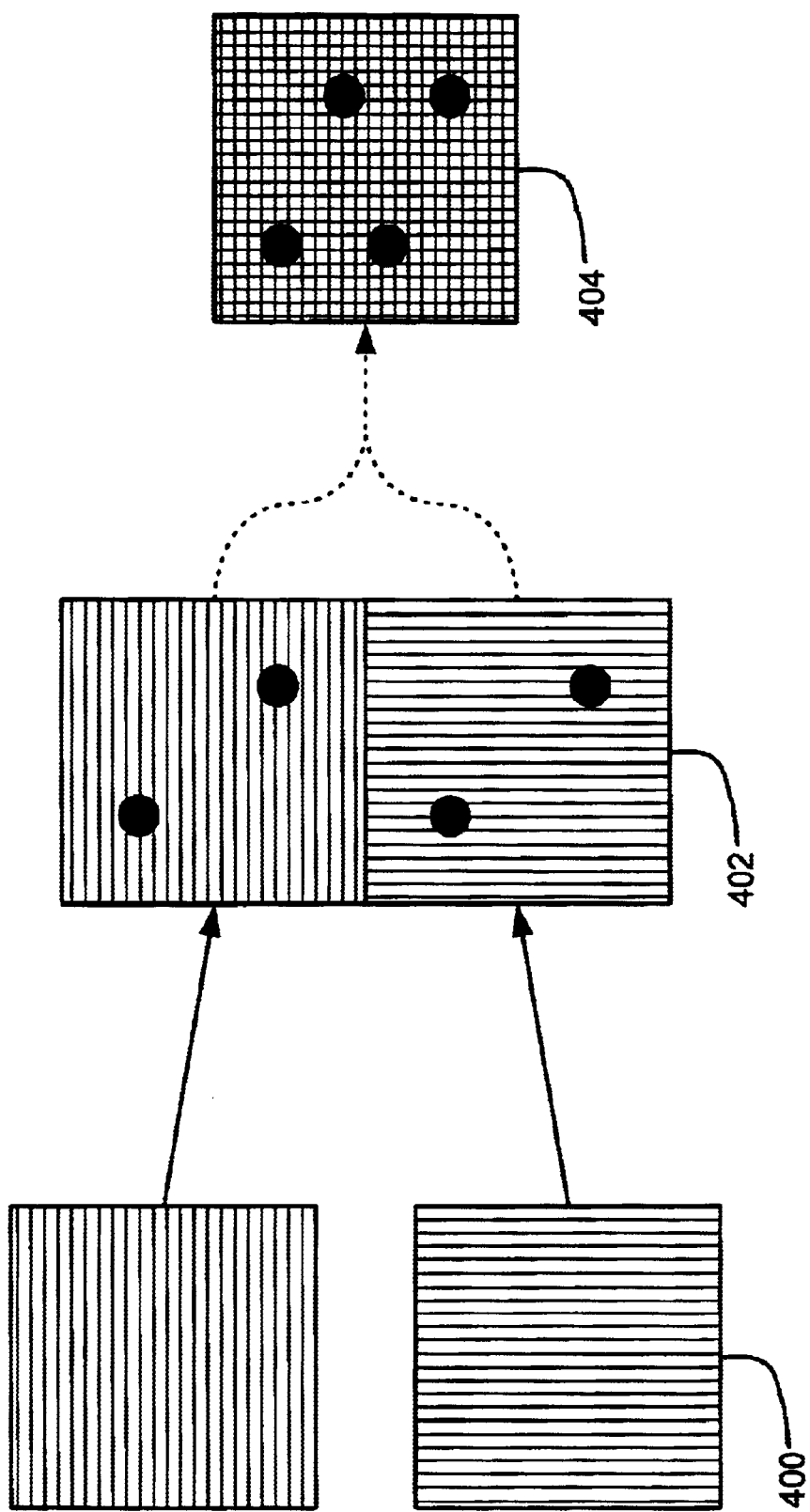
FIG. 4 illustrates the manner in which texture samples retrieved by the shader of FIG. 2 are sampled.

FIG. 4 illustrates the manner in which texture samples 400 generated by the shader 203 of FIG. 2 are sampled. As shown, two separate texture samples 400 may be mapped to two separate pixels 402 which are, in turn, multi-sampled in the aforementioned manner. Also shown is the manner in which the multi-sampled pixels 402 are downfiltered to a display resolution. As mentioned earlier, downfiltering can be done as a separate operation prior to display. Alternatively, downfiltering can be done during the process of scanout and display. In any case, the blended result is shown with downfiltered pixel 404. By this feature duplicate texture information is used across pixels, which reduces texture aliasing.

Figure 5:
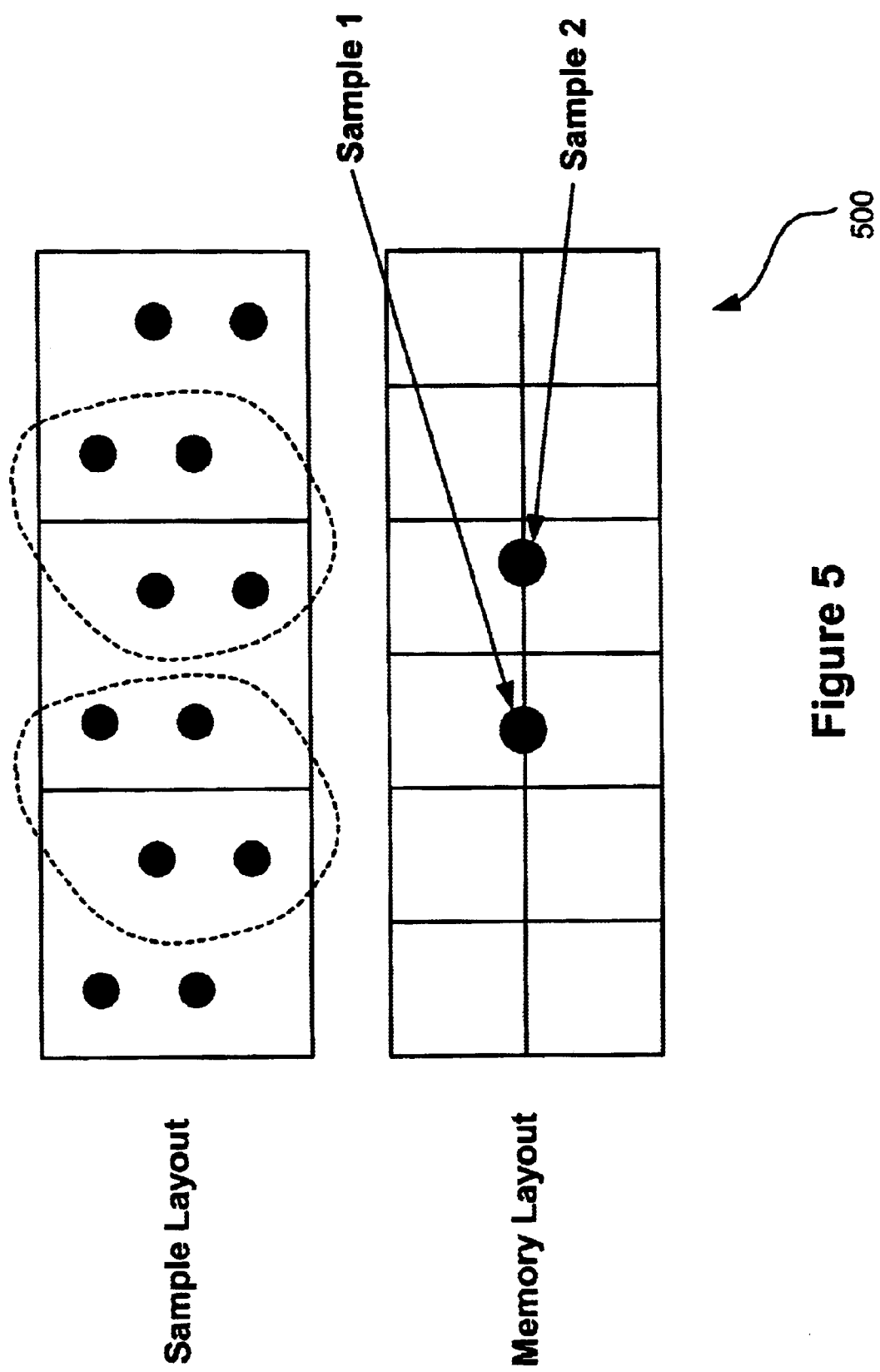
FIG. 5 illustrates the manner in which the present embodiment achieves horizontally neighboring pixel information.

FIG. 5 illustrates the manner 500 in which the present embodiment achieves horizontally neighboring pixel information. As shown, two bilinear samples are taken, but the sample positions are placed very close to the middle 2×2 true samples, rather than exactly in the middle of the 2×2 area to be sampled, which would give an even weighting for all 8 samples. To this end, the 4 true samples are weighted more (i.e. say 75%) and each set of 2 neighbors only 12.5% each.

Figure 6:
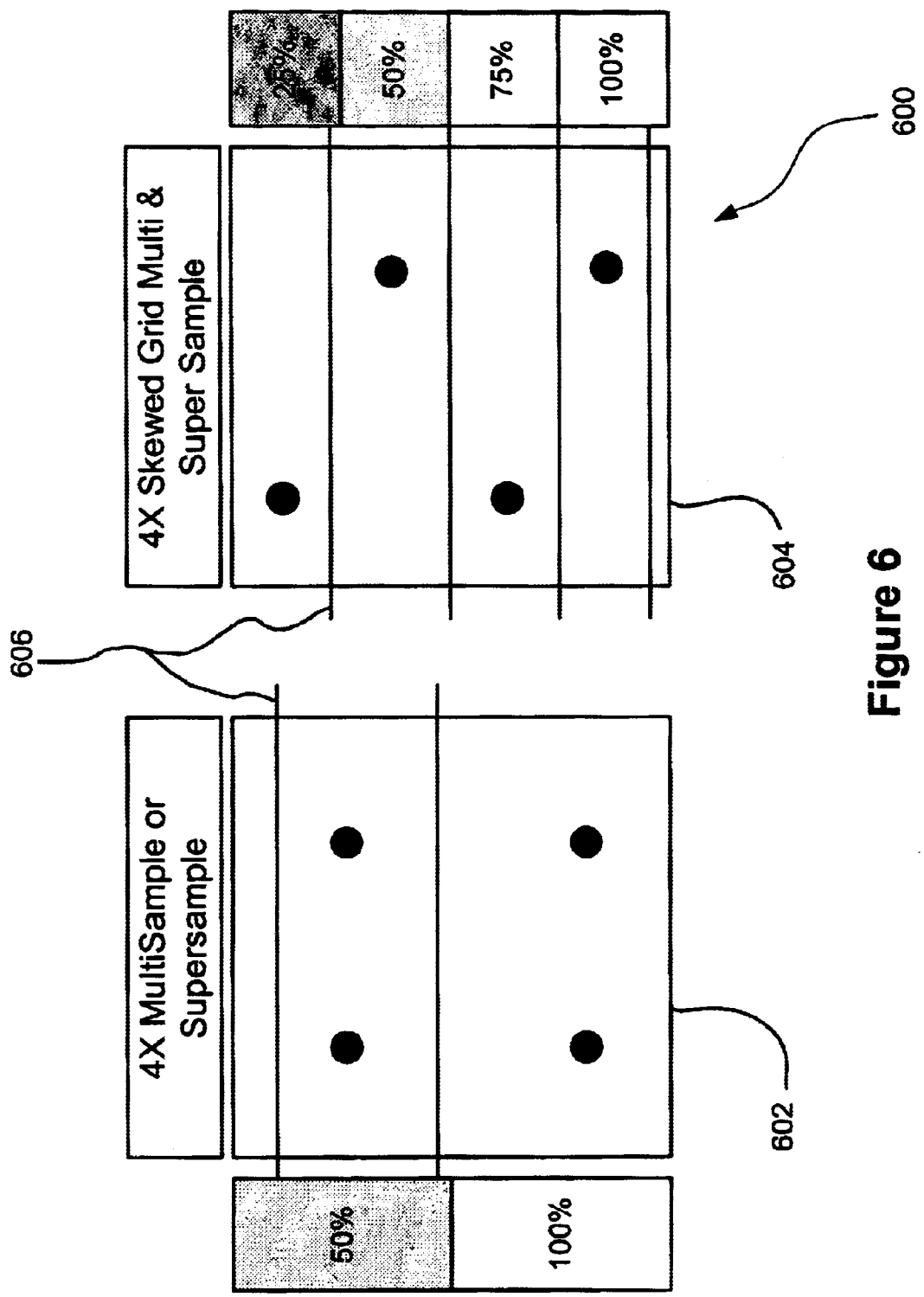
FIG. 6 illustrates the manner in which the edge quality of the present embodiment is improved.

FIG. 6 illustrates the manner 600 in which the edge quality of the present embodiment is improved. There are three factors associated with perceived anti-alias quality. See Table 1.

TABLE 1

1. The number of possible coverage values for nearly horizontal and vertical lines
    Due to the eye having special sensitivity to these lines
    Also due to undersampling of shallow and steep slopes due to the raster pattern on the screen
    This is an advantage for irregular sample patterns
        It is not beneficial to have samples line up vertically or horizontally
2. The number of actual coverage samples
    Controls how many coverage values available
    More samples reduce pixel popping
3 The number of texture samples
    More samples produces results like anisotropic filtering
    Makes things clearer, especially poorly mip-mapped games As shown in FIG. 6, the benefits of the skewed multi-sampling is shown by a comparison between a first pixel 602 with aligned samples and a second pixel 604 with vertically jittered samples. While vertically jittered samples are set forth herein, it should be noted that horizontally jittered samples may also be employed. As shown, coverage mask boundaries 606 are more likely to overlap the samples of the second pixel 602 since they are dispersed more evenly within the pixel. By increasing the chance of overlap, more accurate blending is afforded.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for antialiasing during rendering in a graphics pipeline, comprising:
receiving graphics data in a graphics pipeline;
performing super-sampling on the graphics data utilizing the graphics pipeline; and
performing multi-sampling on the graphics data utilizing the graphics pipeline;
wherein the super-sampling and the multi-sampling are utilized in combination in the graphics pipeline on the same graphics data.

2. The method as recited in claim 1, wherein the multi-sampling improves the speed of the rendering in the graphics pipeline and the super-sampling improves the quality thereof.

3. The method as recited in claim 1, wherein the super-sampling includes point sampling.

4. The method as recited in claim 1, wherein the super-sampling includes area sampling.

5. The method as recited in claim 1, wherein the super-sampling includes calculating vertex data associated with a plurality of samples corresponding to a primitive.

6. The method as recited in claim 5, wherein the vertex data includes color values.

7. The method as recited in claim 5, wherein the vertex data includes z-values.

8. The method as recited in claim 5, and further comprising downfiltering the calculated vertex data for scaling purposes.

9. The method as recited in claim 8, wherein the scaling is 2:1.

10. The method as recited in claim 5, wherein a texture is retrieved for each of the samples.

11. The method as recited in claim 5, wherein the super-sampling includes a super-sampling coverage mask.

12. The method as recited in claim 1, wherein the multi-sampling includes calculating a plurality of jittered samples on a pixel to be depicted on a display.

13. The method as recited in claim 12, wherein the jittered samples are vertically jittered.

14. The method as recited in claim 1, wherein the multi-sampling includes calculating a plurality of samples of a texture mapped to a pixel to be depicted on a display.

15. The method as recited in claim 1, wherein the multi-sampling includes calculating four (4) samples on a pixel to be depicted on a display.

16. A computer program product for antialiasing during rendering in a graphics pipeline, comprising:
(a) computer code for receiving graphics data in a graphics pipeline;
(b) computer code for performing super-sampling on the graphics data utilizing the graphics pipeline; and
(c) computer code for performing multi-sampling on the graphics data utilizing the graphics pipeline;
wherein the super-sampling and the multi-sampling are utilized in combination in the graphics pipeline on the same graphics data.

17. A system for antialiasing during rendering in a graphics pipeline, comprising:
(a) logic for receiving graphics data in a graphics pipeline;
(b) logic for performing super-sampling on the graphics data utilizing the graphics pipeline; and
(c) logic for performing multi-sampling on the graphics data utilizing the graphics pipeline;
wherein the super-sampling and the multi-sampling are utilized in combination in the graphics pipeline on the same graphics data.

18. A method for antialiasing during rendering in a graphics pipeline, comprising:
(a) receiving a primitive including a plurality of vertices in a graphics pipeline;
(b) transforming the vertices utilizing the graphics pipeline;
(c) lighting the vertices utilizing the graphics pipeline;
(d) calculating vertex data associated with a plurality of samples corresponding to the primitive via super-sampling utilizing the graphics pipeline;
(e) performing shading operations on a pixel to be depicted on a display using the vertex data associated with the samples utilizing the graphics pipeline;
(f) calculating a plurality of jittered samples on the pixel to be depicted on a display via multi-sampling utilizing the graphics pipeline;
(g) downfiltering the samples for displaying the pixel on the display;
wherein the super-sampling and the multi-sampling are utilized in combination in the graphics pipeline on the same graphics data.

* * * * *

UNITED STATES PATENT AND TRADEMARK OFFICE
CERTIFICATE OF CORRECTION

PATENT NO. : 6,720,975 B1 Page 1 of 1
APPLICATION NO. : 09/982449
DATED : April 13, 2004
INVENTOR(S) : Dietrich, Jr.

It is certified that error appears in the above-identified patent and that said Letters Patent is hereby corrected as shown below:

Title page, item [57] Abstract, line 20 replace "ufilizing" with --utilizing--.

Signed and Sealed this

Sixteenth Day of February, 2010

David J. Kappos
*Director of the United States Patent and Trademark Office*